(12) United States Patent
Wang et al.

(10) Patent No.: US 11,269,133 B2
(45) Date of Patent: Mar. 8, 2022

(54) DISPLAY MODULE AND DISPLAY DEVICE

(71) Applicants: Hefei Xinsheng Optoelectronics Technology Co., Ltd., Hefei (CN); BOE TECHNOLOGY GROUP CO., LTD., Beijing (CN)

(72) Inventors: Kaiwen Wang, Beijing (CN); Haifeng Xu, Beijing (CN); Yong Ma, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/194,228

(22) Filed: Mar. 6, 2021

(65) Prior Publication Data

US 2022/0026626 A1 Jan. 27, 2022

(30) Foreign Application Priority Data

Jul. 27, 2020 (CN) .......................... 202010733091.5

(51) Int. Cl.
*G02F 1/1333* (2006.01)
*F21V 8/00* (2006.01)
*G02F 1/1335* (2006.01)

(52) U.S. Cl.
CPC .......... *G02B 6/0088* (2013.01); *G02B 6/0055* (2013.01); *G02F 1/133317* (2021.01); *G02F 1/133524* (2013.01); *G02F 1/133314* (2021.01); *G02F 2201/54* (2013.01)

(58) Field of Classification Search
CPC .. G02B 6/0021; G02B 6/0031; G02B 6/0055; G02B 6/0088; G02F 1/133317; G02F 1/133524; G02F 2201/54
See application file for complete search history.

(56) References Cited

U.S. PATENT DOCUMENTS

| 2007/0195220 A1* | 8/2007 | Ono | G02F 1/133308 349/58 |
| 2014/0176852 A1* | 6/2014 | Ha | G02F 1/133308 349/58 |

* cited by examiner

*Primary Examiner* — Keith G. Delahoussaye
(74) *Attorney, Agent, or Firm* — Thomas | Horstemeyer, LLP

(57) ABSTRACT

A display module and a display device are described. The display module includes a back plate; a light guide plate disposed on a side of the back plate; a frame including a first base part and a first bulge extending inward, where the first bulge has a first bottom surface, a first end surface, and a second bottom surface jointed in sequence, an end part of the light guide plate is received in a first accommodating cavity and has a first spacing relative to the first bottom surface; an optical film layer disposed on the side of the light guide plate facing away from the back plate, and an end part thereof is located in a second accommodating cavity and has a second spacing relative to the second bottom surface; the first spacing is smaller than the second spacing.

20 Claims, 3 Drawing Sheets

DISPLAY MODULE AND DISPLAY DEVICE

CROSS-REFERENCE TO RELATED APPLICATION

This application claims the benefit of and priority to Chinese Patent Application No. 202010733091.5, filed on Jul. 27, 2020, where the disclosure of which is incorporated herein by reference in its entirety.

TECHNICAL FIELD

This application relates to the field of display technologies and, in particular, to a display module and a display device.

BACKGROUND

Display devices are used in various electronic products and industries, such as mobile phones and automobiles, as well as traditional televisions or computer monitors. In order to meet market demands, more and more requirements are imposed for display devices.

At present, in order to avoid abnormal noises in a vehicle-mounted display module, a light guide plate (LGP) in the existing display module is generally held with an elastic liner rubber through interference fit. However, for products with a large size, after being assembled and transported, the LGP may raise so that the optical film is in contact with the frame and gets stuck, resulting in wrinkles in the optical film and affecting the display effect.

SUMMARY

The present application provides a display module and a display device.

In a first aspect, embodiments of the application provide a display module, including:

a back plate;

a light guide plate disposed on a side of the back plate;

a frame including a first base part and a first bulge extending inward, and the first bulge includes a first bottom surface, a first end surface, and a second bottom surface jointed in sequence; an end part of the light guide plate is received in a first accommodating cavity formed by the first bottom surface, an inner end surface of the first base part and a surface of the back plate, and a first spacing existing between the end part of the light guide plate and the first bottom surface;

an optical film layer disposed on a side of the light guide plate facing away from the back plate, and an end part of the optical film layer is received in a second accommodating cavity formed by the second bottom surface, the first end surface and a surface on a side of the light guide plate facing away from the back plate, and there is a second spacing between the end part of the optical film layer and the second bottom surface; and the first spacing is smaller than the second spacing.

In a second aspect, embodiments of the application provide a display device including the display module as described in the first aspect.

Additional aspects and advantages of the application will be partly described below, and will become apparent from the following description or be understood through the practice of this application.

BRIEF DESCRIPTION OF THE DRAWINGS

The foregoing and/or other aspects, advantages of the application will be apparent and easy to understand from the following description taken in conjunction with the accompanying drawings in which.

DETAILED DESCRIPTION

Figure 1:
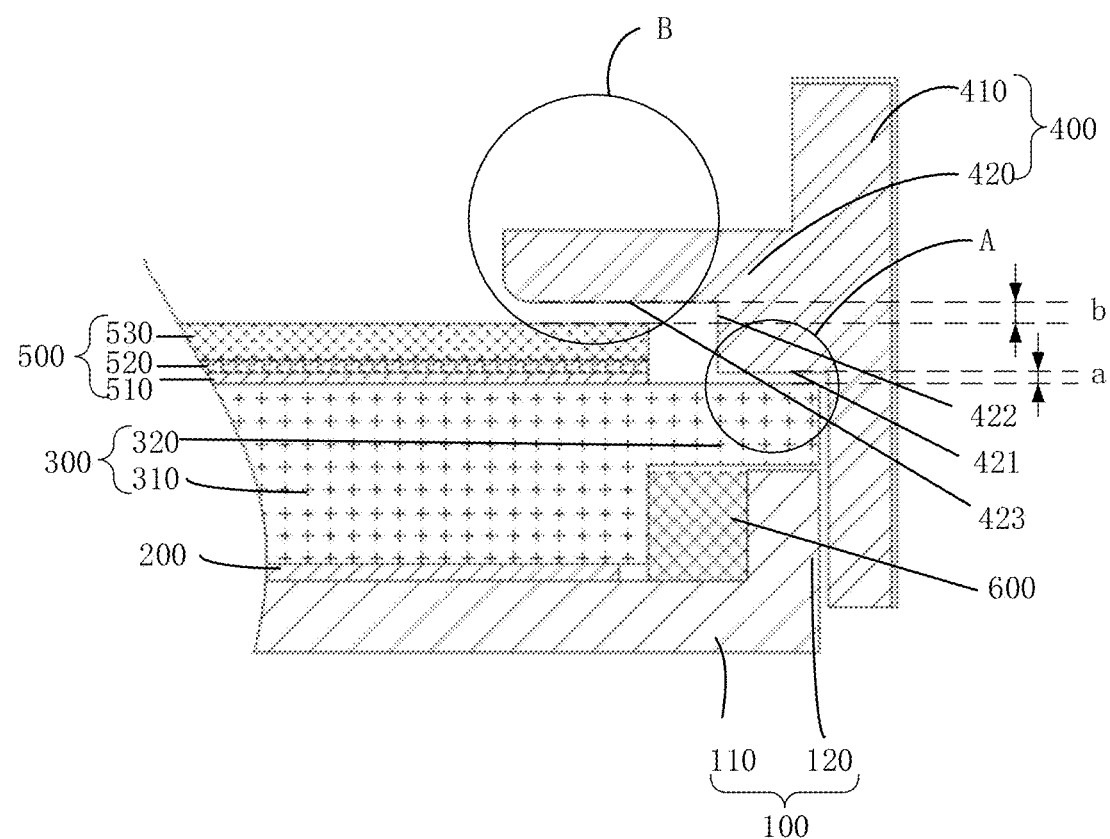
FIG. 1 is a schematic longitudinal sectional view of a display module provided by embodiments of the application.

The present application will be described in detail below. Examples of embodiments of the present application are shown in the accompanying drawings. The same or similar reference numerals in the drawings indicate the same or similar components or components with the same or similar functions. In addition, if a detailed description of the known technology is not essential to the illustrated features of the present application, it will be omitted. The embodiments described below with reference to the accompanying drawings are exemplary, and are only used to explain the present application, and cannot be construed as a limitation to the present application.

Those skilled in the art can understand that, unless otherwise defined, all terms (including technical terms and scientific terms) used herein have the same meanings as commonly understood by those of ordinary skill in the art to which this application belongs. It should also be understood that terms such as those defined in general dictionaries should be understood to have a meaning consistent with the meaning in the context of the prior art, and should not be explained in an idealized or over formal meaning unless they are specifically defined herein.

Those skilled in the art can understand that, unless specifically stated, otherwise singular forms "a", "an", "said", and "the" used herein may also indicate plural forms. It should be further understood that the term "comprising" used in the specification of this application refers to the presence of the described features, integers, steps, operations, elements and/or components, but does not exclude the presence or addition of one or more other features, integers, steps, operations, elements, components, and/or groups thereof. It should be understood that the term "and/or" used herein includes all or any unit and all combinations of one or more associated listed items.

As found by the inventor of the present application through research, elastic liners are generally placed at corners of the light guide plate in the existing vehicle-mounted display modules to abut against and fix the light guide plate, and the magnitude of interference of the elastic liners is generally about 0.4 mm. The light guide plate may slightly raise upward due to squeezing force on the sides after being assembled. The light guide plate may further raise upward after experiencing a bumpy transportation. Such raise cannot be restored due to the compression of the elastic liner. The optical film on the light guide plate is clamped between the light guide plate and the frame, and cannot expand at high temperature. As a result, the optical film comes into contact with and squeezes the frame so that wrinkles occur, which affects the display effect and reduces product quality and product competitiveness.

The display module and display device provided by the present application aim to solve the above technical problems in the related art.

The technical solutions of the present application and how the technical solutions of the present application solve the above technical problems are described in detail below through specific embodiments.

Embodiments of the present application provide a display module. As shown in FIG. 1, the display module includes a back plate 100, a reflective layer 200, a light guide plate 300, a frame 400, and an optical film layer 500.

The reflective layer 200 is disposed on a side of the back plate 100.

The light guide plate 300 is disposed on a side of the reflective layer facing away from the back plate.

The frame 400 includes a first base part 410 and a first bulge 420 that extends inward. The first bulge 420 has a first bottom surface 421, a first end surface 422, and a second bottom surface 423 that are sequentially jointed. An end part of the light guide plate 300 is received in a first accommodating cavity formed by the first bottom surface 421, an inner end surface of the first base part 410 and a surface of the back plate 100, and there is a first spacing 'a' between the end part of the light guide plate and the first bottom surface 421.

The optical film layer 500 is disposed on a side of the light guide plate 300 facing away from the reflective layer 200, and an end part of the optical film layer is received in a second accommodating cavity formed by the second bottom surface 423, the first end surface 422, and a surface of the light guide plate 300 on a side facing away from the reflective layer 200, and there is a second spacing 'b' between the end part of the optical film layer and the second bottom surface 423. The first spacing 'a' is smaller than the second spacing 'b'.

Figure 2:
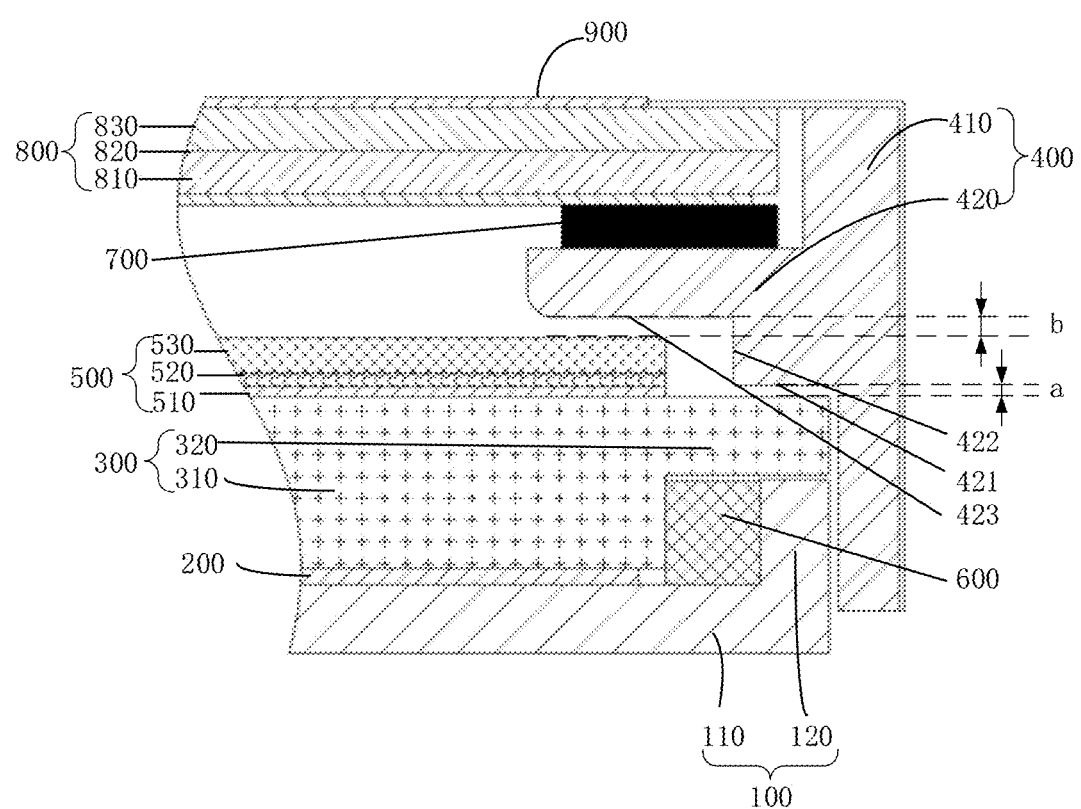
FIG. 2 is a schematic longitudinal sectional view of another display module provided by embodiments of the application.

Specifically, referring to FIGS. 1 and 2, dotted lines are used to indicate the first spacing 'a' and the second spacing 'b'. The two dotted lines used to indicate the first spacing 'a' are aligned to the surface of the light guide plate 300 on the side facing away from the reflective layer 200 and the first bottom surface 421, respectively. The two dotted lines used to indicate the second spacing 'b' are aligned with the surface of the optical film layer 500 on the side facing away from the light guide plate 300 and the second bottom surface 423, respectively.

When the light guide plate 300 of the embodiments of the present application is squeezed or expanded by heat, the surface of the light guide plate 300 facing away from the reflective layer 200 moves toward the first bottom surface 421, thereby driving the optical film layer 500 to move toward the second bottom surface 423. Since the first spacing 'a' is smaller than the second spacing 'b', the optical film layer 500 will not be in contact with the second bottom surface 423, then the optical film layer 500 will never get stuck by the frame 400. Therefore, the optical film layer 500 is prevented from wrinkling, and the display effect will not be affected.

The display module provided by embodiments of the application has an innovative structure and is more practical. The display quality of the display module is greatly improved, and the product competitiveness is improved.

Optionally, a light bar is provided on the inner end surface of the back plate 100 of the embodiment of the present application. The light bar corresponds to the light guide plate 300, and fixedly connected to the back plate 100 by double-sided thermal conductive adhesive.

Figure 3:
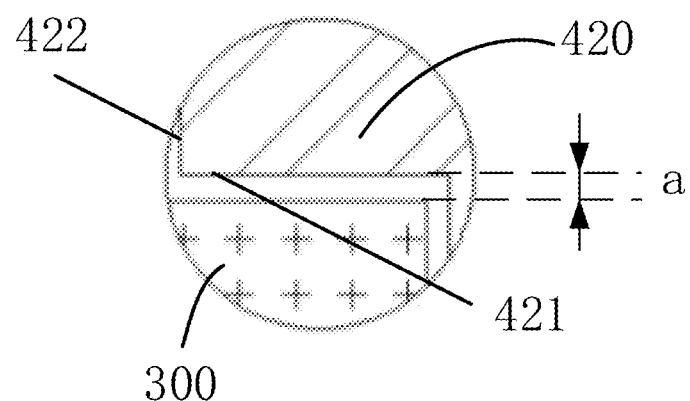
FIG. 3 is a schematic partial enlarged diagram of part A in FIG. 1.

In some embodiments, referring to FIG. 3, the first spacing 'a' is in a range of 0.05~0.1 mm. Specifically, the value of the first spacing 'a' includes endpoint values, that is, the value of the first spacing 'a' can be 0.05 mm or 0.1 mm.

Optionally, the value of the first spacing 'a' is generally 0.1 mm.

Figure 4:
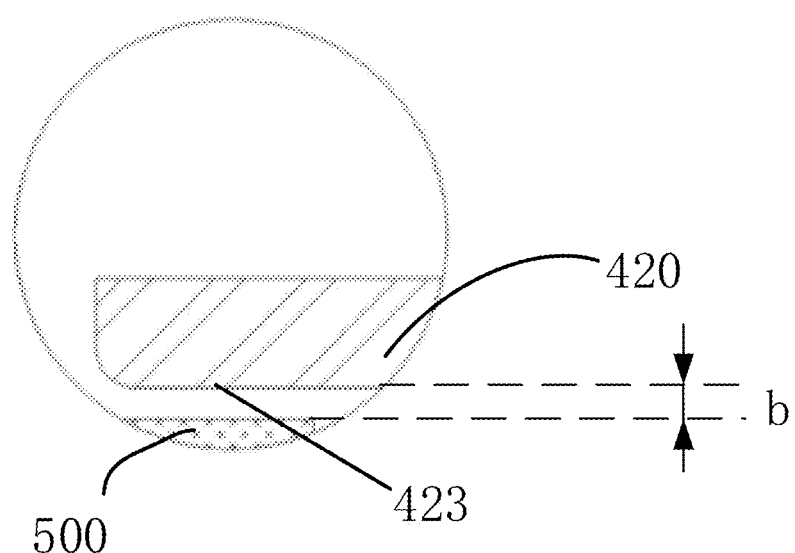
FIG. 4 is a schematic partial enlarged diagram of part B in FIG. 1.

In some embodiments, referring to FIG. 4, the second spacing 'b' is in a range of 0.2~0.35 mm. Specifically, the value of the second spacing 'b' includes endpoint values, that is, the value of the second spacing 'b' can be 0.2 mm or 0.35 mm.

Optionally, the value of the second spacing 'b' is generally 0.2-0.3 mm. For products with a size above 12.3, the second spacing 'b' is generally 0.3 mm.

In some embodiments, referring to FIG. 1, the light guide plate 300 includes a second base part 310 and a second bulge 320 located on both sides of the second base part 310 and extending toward the first accommodating cavity. The thickness of the second bulge 320 is smaller than the thickness of the second base part 310. The thickness direction is a direction perpendicular to the third base part 110 of the back plate 100.

A part of the second bulge 320 is located in the first accommodating cavity. The first spacing 'a' is the spacing between the first bottom surface 421 and a surface of the second bulge on a side facing away from the reflective layer 200.

Specifically, the surface of the second base part 310 and the surface of the second bulge 320 on the side facing away from the reflective layer 200 are aligned to each other, and the surface of the second base part 310 and the surface of the second bulge 320 on the side close to the reflective layer 200 are connected through a connection surface perpendicular to the third base part 110.

Optionally, TARFLON®, ™LC1500, a poly-carbonate resin, is commonly used for the light guide plate 300, and the above-mentioned structure of the light guide plate 300 can be realized by an injection molding process.

Optionally, the second bulge 320 is located at both ends of the second base part 310 on one side, and the other parts may not be provided with bulge structures.

In some embodiments, the back plate 100 includes a third base part 110 and a third bulge 120 located on both sides of the third base part 110 and protruding toward the light guide plate 300.

The first accommodating cavity is formed by the first bottom surface 421, the inner end surface of the first base part 410 and the surface of the third bulge 120 on a side facing away from the third base part 110.

Optionally, the third bulge 120 is located inside the frame 400.

In some embodiments, a first elastic liner 600 is provided between the light guide plate 300 and the back plate 100.

The first elastic liner 600 is received in a third accommodating cavity formed by the second base part 310, the second bulge 320, the third base part 110 and the third bulge 120, and there is a third spacing between a surface of the first elastic liner facing away the back plate 100 and a surface of the second bulge toward the back plate 100. In this way, a tolerant distance is further provided for the movement of the guide light plate and the optical film layer in the vertical direction, so that the optical film layer will not get stuck by the frame. Therefore, wrinkling of the optical film layer 500 is prevented, and the display effect will not be affected.

Optionally, both ends of the reflective layer 200 are not in contact with the first elastic liner 600.

Optionally, the first elastic liner 600 is a rubber gasket.

In some embodiments, referring to FIG. 2, a display panel 800 is provided on the side of the first bulge 420 facing away from the light guide plate 300.

The display panel 800 is fixed to the frame 400 by an encapsulation 900 provided on the side of the display panel 800 facing away from the first bulge 420.

In some embodiments, referring to FIG. 2, a second elastic liner 700 is disposed between the display panel 800 and the first bulge 420.

Optionally, the second elastic liner 700 is fixed on a surface of the first bulge 420 where the second bottom surface 423 is located and corresponds to the second bottom surface 423. The surface of the first bulge 420 corresponding to the second bottom surface 423 is parallel to the second bottom surface 423.

Optionally, the second elastic liner 700 is made from cushion foam.

In some embodiments, as shown in FIG. 1 and FIG. 2, the display module includes at least one of the following: an array substrate 810, a liquid crystal layer 820 and a color filter substrate 830 stacked in sequence included in the display panel 800.

Optionally, the encapsulation 900 is located on the side of the color filter substrate 830 facing away from the liquid crystal layer 820, and the encapsulation 900 is fixed to the color filter substrate 830 and the frame 400, thereby fixing the display panel 800 and the frame 400.

Optionally, the array substrate 810 or the color filter substrate 830 is dropped with liquid crystal and coated with sealant, and the array substrate 810 containing the liquid crystal and the sealant is assembled with the color filter substrate 830, so that a liquid crystal layer 820 is formed between the array substrate 810 and the color filter substrate 830.

Optionally, the display panel 800 further includes polarizers arranged in pairs.

The optical film layer 500 includes a diffusion sheet 510, a prism sheet 520, and a light sheet 530 stacked in sequence.

Optionally, referring to FIG. 1, there is a gap between the optical film layer 500 and the first end surface 422.

Optionally, the surface of the light guide plate 300 close to the optical film layer 500 can be provided with a convex structure, and the surface of the optical film layer 500 close to the light guide plate 300 can be provided with a groove structure matching the convex structure, so that there is a displacement between the optical film layer 500 and the guide plate 300 in the horizontal direction.

In some embodiments, the first bottom surface 421 and the second bottom surface 423 are both parallel to the surface of the light guide plate 300 on the side facing away from the reflective layer 200.

The first end surface 422 is perpendicular to the first bottom surface 421 and the second bottom surface 423.

Optionally, referring to FIG. 1, compared with the part where the first bottom surface 421 is located, the part where the second bottom surface 423 is located extends inward a longer length. The end surface of the part where the second bottom surface 423 is located is parallel to the first end surface 422, and the transition part between the end surface of the part where the second bottom surface 423 is located and the second bottom surface 423 is a circular arc.

Optionally, there is a gap between the display panel 800/the second elastic liner 700 and the inner end surface of the frame 400.

Based on the same inventive concept, an embodiment of the present application further provides a display device including the display module described in any one of the embodiments of the present application.

By applying the embodiments of this application, at least the following beneficial effects can be achieved.

(1) When the light guide plate 300 of the embodiments of the present application is squeezed or expanded by heat, the surface of the light guide plate 300 facing away from the reflective layer 200 moves toward the first bottom surface 421, thereby driving the optical film layer 500 to move toward the second bottom surface 423. Since the first spacing 'a' is smaller than the second spacing 'b', the optical film layer 500 will not be in contact with the second bottom surface 423, then the optical film layer 500 will never get stuck by the frame 400. Therefore, the optical film layer 500 is prevented from wrinkling, and the display effect will not be affected.

(2) The display module provided by embodiments of the application has an innovative structure and is more practical. The display quality of the display module is greatly improved, and the product competitiveness is improved.

Those skilled in the art can understand that the various operations, methods, steps in the process, measures, and solutions that have been discussed in this application can be alternated, changed, combined, or deleted. Further, various operations, methods, and other steps in the process, measures, and solutions that have been discussed in this application can also be alternated, changed, rearranged, decomposed, combined, or deleted. Further, the steps, measures, and schemes in the various operations, methods, and procedures in the related art that have the same operations, methods, and procedures disclosed in this application can also be alternated, changed, rearranged, decomposed, combined, or deleted.

In the description of this application, it should be understood that the orientation or positional relationship indicated by terms "center", "upper", "lower", "front", "rear", "left", "right", "vertical", "horizontal", "top", "bottom", "inner", "outer", and so on is based on the orientation or positional relationship shown in the drawings, and is only for the convenience of describing the application and simplifying the description, rather than indicating or teaching that the referred device or element must have a specific orientation, be constructed and operated in a specific orientation, and therefore cannot be understood as a limitation of the present application.

The terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of this application, unless otherwise specified, "plurality" means two or more.

In the description of this application, it should be noted that, unless otherwise clearly specified and defined, the terms "installation", "connection", and "jointed" should be understood in a broad sense, for example, it can be a fixed connection or a detachable connection, or integrally connected. It can be directly connected, or indirectly connected through an intermediate medium, and it can be the internal communication between two components. For those skilled in the art, the specific meanings of the above-mentioned terms in this application can be understood under specific circumstances.

In the description of this specification, specific features, structures, materials, or characteristics may be combined in any one or more embodiments or examples in a suitable manner.

It should be understood that although various steps in the flowchart of the drawings are displayed in sequence as indicated by the arrows, these steps are not necessarily performed in sequence in the order indicated by the arrows. Unless explicitly stated, there is no strict order for the execution of these steps, and they can be executed in other orders. Moreover, at least part of the steps in the flowchart of the drawings may include multiple sub-steps or multiple stages. These sub-steps or stages are not necessarily executed at the same time, but can be executed at different times. The order of execution is not necessarily performed sequentially, but may be performed alternately or alternately with at least a part of other steps or sub-steps or stages of other steps.

The above are only some implementations of this application. It should be noted that for those of ordinary skill in the art, without departing from the principle of this application, several improvements and modifications can be made, and these improvements and modifications are also regarded as the scope of protection of this application.

What is claimed is:

1. A display module, comprising:
    a back plate;
    a light guide plate disposed on a side of the back plate;
    a frame, wherein the frame comprises a first base part and a first bulge extending inward, and the first bulge comprises a first bottom surface, a first end surface, and a second bottom surface jointed in sequence, wherein an end part of the light guide plate is received in a first accommodating cavity formed by the first bottom surface, an inner end surface of the first base part and a surface of the back plate, and there is a first spacing between the first bottom surface and the end part of the light guide plate; and
    an optical film layer disposed on a side of the light guide plate facing away from the back plate, wherein an end part of the optical film layer is received in a second accommodating cavity formed by the second bottom surface, the first end surface and a surface of the light guide plate on the side facing away from the back plate, and there is a second spacing between the second bottom surface and the end part of the optical film layer;
    wherein the first spacing is smaller than the second spacing.

2. The display module according to claim 1, wherein the first spacing is in a range of 0.05~0.1 mm.

3. The display module according to claim 1, wherein the second spacing is in a range of 0.2~0.35 mm.

4. The display module according to claim 1, wherein the light guide plate comprises a second base part, and a second bulge located on both sides of the second base part and extending toward the first accommodating cavity;
    wherein a thickness of the second bulge is smaller than a thickness of the second base part;
    wherein a part of the second bulge is located in the first accommodating cavity; and
    the first spacing is a spacing between the first bottom surface and a surface of the second bulge on the side facing away from the back plate.

5. The display module according to claim 4, wherein the back plate includes a third base part, and a third bulge located on both sides of the third base part and protruding toward the light guide plate;
    wherein the first accommodating cavity is formed by the first bottom surface and the inner end surface of the first base part and a surface of the third bulge on a side facing away from the third base part.

6. The display module according to claim 5, wherein a first elastic liner is provided between the light guide plate and the back plate;
    wherein the first elastic liner is received in a third accommodating cavity formed by the second base part, the second bulge, the third base part and the third bulge, and there is a third spacing between a surface of the first elastic liner facing away the back plate and a surface of the second bulge toward the back plate.

7. The display module according to claim 1, wherein a display panel is provided on a side of the first bulge facing away from the light guide plate;
    wherein the display panel is fixed to the frame by an encapsulation provided on a side of the display panel facing away from the first bulge.

8. The display module according to claim 7, wherein a second elastic liner is provided between the display panel and the first bulge.

9. The display module according to claim 1, wherein the first bottom surface and the second bottom surface are both parallel to a surface of the light guide plate on the side facing away from the back plate;
    wherein the first end surface is perpendicular to the first bottom surface and the second bottom surface.

10. The display module according to claim 1, wherein a reflective layer is disposed between the light guide plate and the back plate.

11. A display device comprising a display module, wherein the display module comprises:
    a back plate;
    a light guide plate disposed on a side of the back plate;
    a frame, wherein the frame comprises a first base part and a first bulge extending inward, and the first bulge comprises a first bottom surface, a first end surface, and a second bottom surface jointed in sequence, wherein an end part of the light guide plate is received in a first accommodating cavity formed by the first bottom surface, an inner end surface of the first base part and a surface of the back plate, and there is a first spacing between the first bottom surface and the end part of the light guide plate; and
    an optical film layer disposed on a side of the light guide plate facing away from the back plate, wherein an end part of the optical film layer is received in a second accommodating cavity formed by the second bottom surface, the first end surface and a surface of the light guide plate on the side facing away from the back plate, and there is a second spacing between the second bottom surface and the end part of the optical film layer;
    wherein the first spacing is smaller than the second spacing.

12. The display device according to claim 11, wherein the first spacing is in a range of 0.05~0.1 mm.

13. The display device according to claim 11, wherein the second spacing is in a range of 0.2~0.35 mm.

14. The display device according to claim 11, wherein the light guide plate comprises a second base part, and a second bulge located on both sides of the second base part and extending toward the first accommodating cavity;

wherein a thickness of the second bulge is smaller than a thickness of the second base part;

wherein a part of the second bulge is located in the first accommodating cavity; and the first spacing is a spacing between the first bottom surface and a surface of the second bulge on the side facing away from the back plate.

15. The display device according to claim 14, wherein the back plate includes a third base part, and a third bulge located on both sides of the third base part and protruding toward the light guide plate;

wherein the first accommodating cavity is formed by the first bottom surface and the inner end surface of the first base part and a surface of the third bulge on a side facing away from the third base part.

16. The display device according to claim 15, wherein a first elastic liner is provided between the light guide plate and the back plate;

wherein the first elastic liner is received in a third accommodating cavity formed by the second base part, the second bulge, the third base part and the third bulge, and there is a third spacing between a surface of the first elastic liner facing away the back plate and a surface of the second bulge toward the back plate.

17. The display device according to claim 11, wherein a display panel is provided on a side of the first bulge facing away from the light guide plate;

wherein the display panel is fixed to the frame by an encapsulation provided on a side of the display panel facing away from the first bulge.

18. The display device according to claim 17, wherein a second elastic liner is provided between the display panel and the first bulge.

19. The display device according to claim 11, wherein the first bottom surface and the second bottom surface are both parallel to a surface of the light guide plate on the side facing away from the back plate;

wherein the first end surface is perpendicular to the first bottom surface and the second bottom surface.

20. The display device according to claim 11, wherein a reflective layer is disposed between the light guide plate and the back plate.

* * * * *